United States Patent [19]

Heyerdahl

[11] 3,910,147

[45] Oct. 7, 1975

[54] CHAIN SAW SWORD, A SAW CHAIN AND METHOD OF FORMING SAW CHAIN

[75] Inventor: Arthur Eugen Heyerdahl, Oslo, Norway

[73] Assignee: Elkem-Spigerverket A/S Jobu, Drobak, Norway

[22] Filed: Nov. 23, 1973

[21] Appl. No.: 418,240

[30] Foreign Application Priority Data
Nov. 29, 1972 Norway.............................. 4388/72

[52] U.S. Cl. ...................... 83/830; 83/698; 30/381; 29/509
[51] Int. Cl.² ...................... B26D 1/46; B27B 33/14
[58] Field of Search ............ 83/788, 830, 831, 832, 83/833, 834, 698

[56] References Cited
UNITED STATES PATENTS

| | | | |
|---|---|---|---|
| 1,598,853 | 9/1926 | Daw.................................. | 83/830 X |
| 1,655,856 | 1/1928 | Bens.................................. | 83/832 |
| 2,891,586 | 6/1959 | Wright.............................. | 83/834 X |

FOREIGN PATENTS OR APPLICATIONS

| | | | |
|---|---|---|---|
| 522,551 | 3/1956 | Canada................................. | 83/831 |
| 221,661 | 12/1942 | Switzerland.......................... | 83/830 |

Primary Examiner—Willie G. Abercrombie
Attorney, Agent, or Firm—Wenderoth, Lind & Ponack

[57] ABSTRACT

A saw chain includes a plurality of links pivotally interconnected by complementary circular openings and heads, the peripheries of which are respectively in the form of V-shaped ridges and grooves, each providing two flat sliding surfaces. A saw sword support has guiding rails which laterally support the saw chain. The total thickness of the saw sword support is no more than the cutting width of the saw chain. In assembling the saw chain, the head is provided with one sliding surface and a cylindrical stem extending therefrom. The stem is inserted in an opening, and then the stem is deformed outwardly to form the second sliding surface of the head.

4 Claims, 11 Drawing Figures

CHAIN SAW SWORD, A SAW CHAIN AND METHOD OF FORMING SAW CHAIN

BACKGROUND OF THE INVENTION

The present invention relates to chains, more particularly to saw chains for chain saws. The invention relates furthermore to a chain saw sword with a new design and finally to a method for making such saw chains.

The saw chain in accordance with the invention is more particularly of the type wherein adjacent links of the chain are not coupled together by means of bolts, rivets or the like, but in that adjacent links are interlocked in that each link at the end thereof is provided with complementary arc-shaped link heads and openings, such that each head is positioned in a complementary arc-shaped opening in the adjacent link.

In the past, various types of such saw chains have been known, for instance such as disclosed in U.S. Pat. Nos. 1,178,362 and 1,598,153. In these prior chains there are provided special connecting links which interconnect the actual links provided with tool elements. The general purpose of such prior chain designs was to provide for less expensive and simpler production of chain saws. A further purpose was to provide a chain saw having a lighter weight saw chain. A further purpose was to provide a saw chain having a narrower width in order to be able to make a narrower cut through the wood element. A narrow cut is difficult to obtain with conventional saw chains wherein the separate links overlap each other in alternating manner, the links being interlocked by means of rivets or the like.

However, previously known saw chains having links which are linked together by means of arc-shaped heads and openings at the ends thereof have however hitherto been hampered by shortcomings and disadvantages which have prevented such chains from being accepted in general use. Such chains have particularly not been accepted for use in connection with manually operated chain saws having a so-called saw sword which is driven by a small gasoline engine or an electric motor.

One reason for this lack of acceptance seems to be that prior chains having directly interlocked links have not presented a sufficiently reliable mechanical connection between the separate links. In particular, prior constructions of such chains have not offered sufficient lateral support and/or interlocking between the separate links in order that lateral displacements can be avoided. In order to obtain additional lateral support between the separate links it has been necessary to provided the chain with additional key connections or the like between adjacent links, particularly in designs such that the undersides of the links slide in a groove between two rails which thus rest against the opposite lateral faces of the chain. A special peril with such chain designs is that if the chain breaks, with the result that it is thrown out of its sliding seat, then the separate links in the chain will disintegrate. That is, the links will separate from each other and be thrown out into the environment and may injure the operator and cause other damage.

In order to prevent the links from accidently separating from each other or from being displaced laterally when operating the saw, it is furthermore known to provide the separate links with convex and concave interlocking surfaces, such that the sliding faces of adjacent links to a certain degree are put into engagement with each other subsequent to being initially forged together when assembly and mounting the chain. However, solutions of this kind have not proved to provide the necessary interlocking and linking of adjacent links, and it has furthermore proved to be complicated and expensive to produce such chains.

SUMMARY OF THE INVENTION

The primary object for the present invention is to provided a new type of saw chain of the type having directly interlocked chain links by providing the links at the ends thereof with arc-shaped heads and openings, thus making it unnecessary to utilize additional rivets or the like to provide the link connection.

A further object of the present invention is to provide such a saw chain having a design such that the total width of the saw may be reduced, thus making it possible to make narrower cuts when sawing through wood members.

A still further object of the present invention is to provide a new type of chain saw sword, utilizing chains in accordance with the invention.

A yet further object of the present invention is to provide a new method for making such chains.

The saw chain in accordance with the present invention is of the kind constructed to be mounted on a sword or support frame for a chain saw. The chain comprises links which are interconnected by means of circularly shaped head means which are joined with complementary configured shaped openings in adjacent links. The complementary peripheral surfaces of the head means and the openings constitute the sliding surfaces of the links of the chain, and are grooved and bevelled, respectively, along the contact faces in order to prevent relative lateral displacement of the links. Thus, the circularly shaped sliding surfaces of the links, viewed in a cross-sectional plane, are V-shaped or substantially V-shaped substantially symmetrically relative to a plane through the center of the links and normal to the rotational axis of the links. The head means are shaped in any conventional manner to have a circular arc form with a neck extending therefrom and are assembled into complementary circular arc-shaped openings having a radially directed mouth in an adjacent link. The links of a chain are permanently interlocked during assembly by means of a suitable operation, such as forging.

By the construction in accordance with the invention are obtained two primary advantages. First, adjacent links in the chain are fixed laterally with respect to each other, since they are closely interlocked by means of the forging operation. Secondly, the sliding faces between adjacent links are formed in the nature of two opposed wedge-shaped sliding faces, whereby the link connections will be self-aligning or self-directing. This has the effect that tension and stress in the chain are centered and the resultant force of such tension and stress extends along the mid-plane of the chain without the formation of laterally directed moments of force. Practical trials have proven that this condition is maintained even after a chain in accordance with the present invention has been under use for substantial lengths of time.

A substantial safety and operational advantage obtained is that the separate links in the chain will not be separated, even if one link in the chain breaks.

The invention can be utilized both for lighter and heavier types of chains, but it has proved especially well adapted for light-weight, thin or narrow chain saws. The invention makes it possible to produce saw chains which are lighter and narrower and which thus provide a narrower cut than has hitherto been possible.

In a preferred embodiment for a chain in accordance with the invention, the chain includes two types of links, i.e. cutting links provided with tool edges in the shape of saw teeth, and intervening coupling links. The cutting links are preferably provided with circularly shaped openings at opposite ends thereof, the peripheral surfaces of such openings being in the form of a V-shaped bevel or ridge. The coupling links are provided with circularly shaped heads at opposite ends thereof, the peripheral surfaces of such heads being in the form of V-shaped grooves complementary-shaped to the V-shaped bevel of the cutting link openings.

A saw chain of this type provides, among others, the advantage that the chain is more flexible in a plane normal to the rotational axis of the chain, thus making it possible to mount the chain around relatively small running and driving wheels, a feature which again implies that a small manual chain saw having such a saw chain can be provided with a smaller and thereby lighter weight saw sword.

The saw sword or support frame of a portable motor chain saw is usually provided with a continuous peripherical sliding path, such as a slot, for the chain, and along the sides of the path extend sliding rails, frequently referred to as "shims", which rest against the opposed sides of the lower parts of the chain. With a saw chain in accordance with the invention the sliding path be made much narrower than in conventional chain saws, and the side rails can furthermore be made very thin and extend further along the sides of the chain toward the cutting teeth, inasmuch as the chain is provided with plane and smooth lateral faces. This results in several advantages. The total width of the sword and thereby the width of the cut can be made narrower than in previously known saws. This makes it possible for the sword as a whole to be made lighter than in conventional saws. A saw sword provided with a chain in accordance with the invention can therefore be made with a thickness or width of about 50% of that of a conventional saw sword provided with a conventional saw chain.

The invention also relates to a specific method for making a saw chain in accordance with the invention. The method is generally characterized in that the circularly shaped head means on the coupling links, and which are to eventually be formed with V-shaped grooves, are initially provided with only one of the sloped sliding surfaces of such groove and with an integral cylindrical blank or stem to be formed into the other sliding surface. The cylindrical blank has a diameter to snugly fit into the complementary circularly shaped opening in the adjacent cutting link. The cylindrical blank is assembled into place in the opening, whereafter a suitable forging tool, preferably a rotatable conical die or mandrel, is positioned in the center of the end surface of the blank and is pressed against the blank while being rotated. This causes the metal of the blank to be forced radially outwardly such that the outer surface thereof assumes a conical shape and slopes outwardly into rest against the complementary sloped side face on the ridge or bevel of the cutting link. Thus, there is formed the complementary conically shaped link mechanism.

BRIEF DESCRIPTION OF THE DRAWINGS

The invention is illustrated in the accompanying drawings wherein:

FIGS. 7–9b show detail views illustrating the method used to make a saw chain in accordance with the present invention.

DETAILED DESCRIPTION OF THE INVENTION

Figure 1:
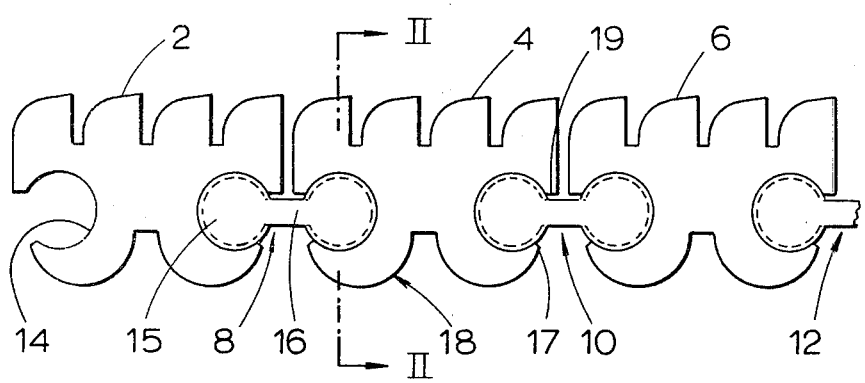
FIG. 1 is a lateral view of a part of the saw chain in accordance with the present invention.

In FIG. 1 the reference numbers 2, 4 and 6 respectively designate three cutting links in a saw chain, the term "cutting links" implying links provided with saw teeth. The adjacent cutting links are interconnected by means of coupling links 8, 10 and 12. The cutting links are provided at the opposite ends thereof with circularly shaped bearing openings 14 in which are positioned complementary circularly shaped heads 15 of the coupling links. The heads 15 of each coupling link are connected by a rod-shaped element 16 the width of which is suitably adapted such that the cutting links and coupling links may undergo mutual pivoting movement, which movement is limited by the distance between the opening edges 17 and 19 of the openings 14 and by the width of the coupling link rods 16. The underside or the base 18 of the cutting links is provided with special engagement means to be described in greater detail below.

Figures 2, 3:
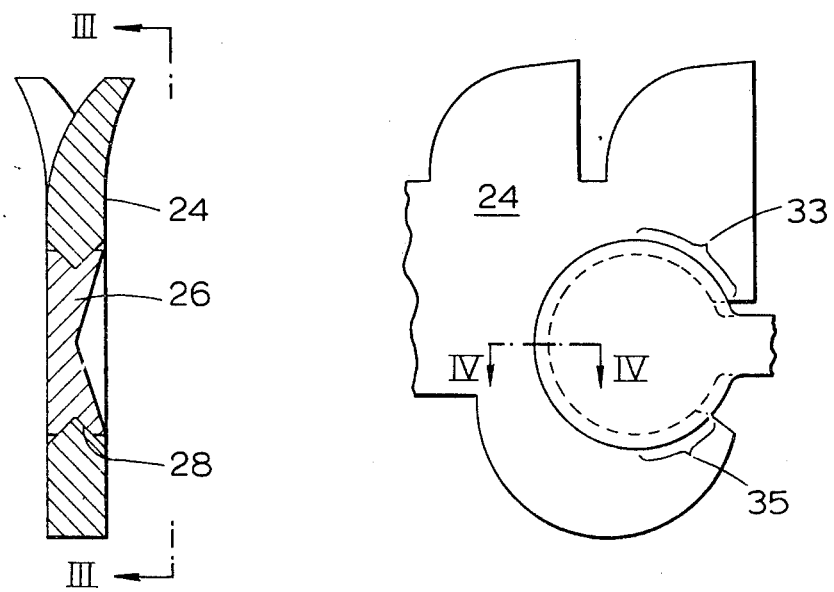
FIG. 2 is a cross-section along the lines II—II in FIG. 1.
FIG. 3 is a lateral view along the lines III—III in FIG. 2.
Figure 4:
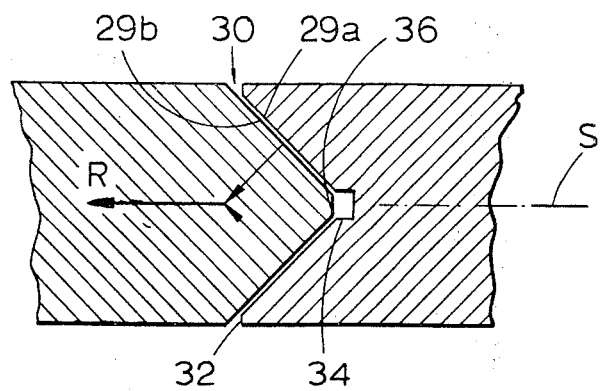
FIG. 4 is a detailed cross-sectional view seen in an enlarged scale along the lines IV—IV shown in FIG. 3.

As shown in FIGS. 2–4, the peripheral surface of the opening in each cutting link 24 is formed in the shape of a V-shaped ridge or bevel, the beveled edges of which are symmetrically arranged on both sides of the mid-plane of the link. The complementary circularly shaped head 26 on each coupling link is provided with a complementary V-shaped groove 28 which as shown mates with the ridge such that the cutting link and coupling link are pivotally interconnected by means of respective mating wedge-shaped bearing surfaces 29b and 29a, as shown in the fragmentary section in FIG. 4. The angle to the mid-plane of the links of bearing surfaces 29a and 29b can be selected arbitrarily, preferably between a range of 30° and 60°, but best results have been obtained when selecting an angle of 45° relative to the mid-plane, such that the mutual angle between the bearing surfaces is 90°. The resultant tension and compression stresses acting on each cutting link will then be concentrated along the mid-plane S, as shown in FIG. 4, as a resultant force component R. These forces, usually present as tensional stresses, will normally be transferred between the links in the arc-shaped zones 33 and 35 as shown in FIG. 3. As furthermore shown in FIG. 4 at 30 and 32, both outside edges of the V-shaped groove are bevelled in order to avoid the formation of metal chips. Further, the edge along the V-shaped bevel or ridge is likewise bevelled as shown at 36, and along the bottom of the V-shaped groove is machined a special bottom groove 34 in order to insure that no metal or bearing contact is created between the edge of the ridge and the bottom of the V-shaped groove. Such undesired bearing conduct, among other disadvantages, would prevent the desired two-faced, wedge-shaped sliding surface contact after the chain had been in use for some time and there had been a given wear along the sliding surfaces.

Figure 5:
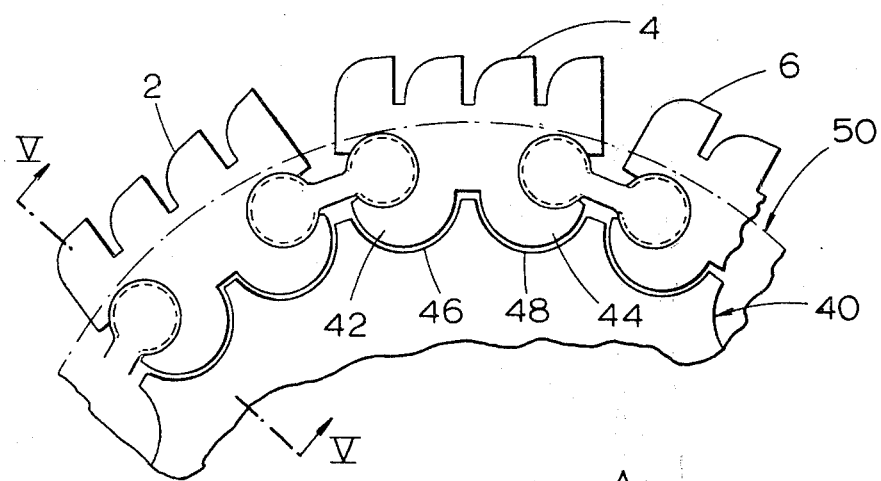
FIG. 5 is a lateral view of a chain as shown in FIG. 1, but mounted on a running wheel.

In FIG. 5 is shown a saw chain in accordance with the present invention in position on a driving or running wheel 40. A feature of the invention is that each cutting link 2, 4, 6, etc. is provided at the bottom thereof with two extremities 42 and 44, such as rounded portions, which engage with complementary teeth or recesses 46 and 48 on the wheel 40. This duplicate engagement of each cutting link with the wheel insures a stable support of the links and prevents tilting of the separate links along the running wheel during the sawing operation, a problem which in conventional chains frequently leads to breakage of the chain. Such supporting means is hardly possible in connection with conventional saw chains wherein the separate links alternatively overlap each other, the external link parts resting against the guiding rails.

Figure 6:
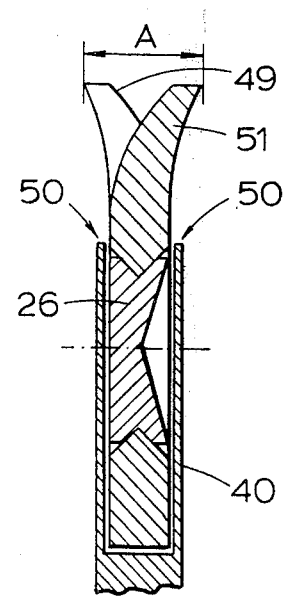
FIG. 6 is a cross-section along the lines V—V in FIG. 5.

The double-stitched line in FIG. 5 designates the top edges 50 of the guiding rails or shims and which extend on opposite sides of the chain in accordance with the invention. These rails are in accordance with the invention made much thinner than is usual and extend farther up on the chain. Specifically, the rails in fact extend to above the circularly shaped link connection substantially all the way up to the teeth of each cutting link. As shown in FIG. 6, the saw teeth 49 and 51 are in the usual manner alternately bent to the side such that the saw chain attains a cutting width designated A. Cutting width A is adapted relative to the thickness of the guiding rails 50 that the distance between opposed outside faces of rails 50 is equal to or somewhat less than the cutting width A. A sawing tool with a saw chain in accordance with the invention, usually in the shape of a so-called saw sword, will thus attain a total width which is equal to or less than the cutting width A and this width will be less than one half of the corresponding width of a conventional saw sword having the same sawing capacity.

Figure 7:
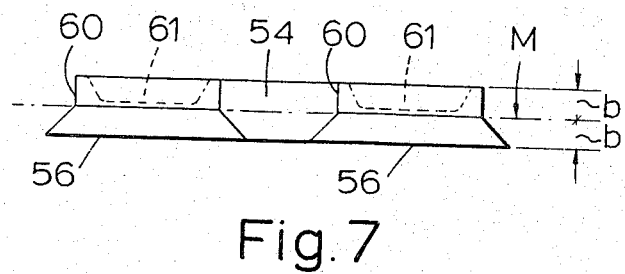
Figure 8:
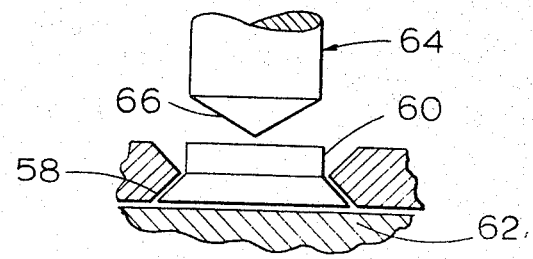
Figures 9A, 9B:
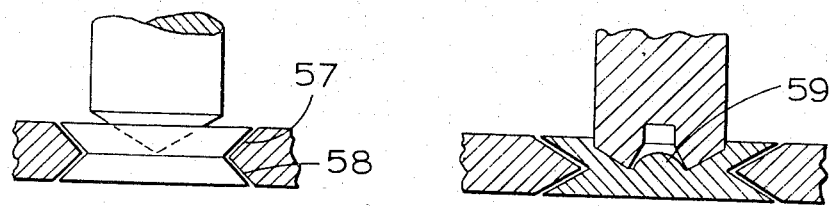

FIGS. 7, 8 and 9 illustrate how a saw chain in accordance with the invention can be made. FIG. 7 shows a lateral or top view of a coupling link 8 such as shown in FIG. 1. This coupling link is preliminarily formed by known operations, such as made in the usual way by means of partly dying, die forging, machining operations, to provide a blank provided with two circularly shaped heads and the connecting rod 54. The heads proper are from one side of the center plane M of the blank, each provided with a conical head section 56 having a sliding surface complementary to the complementary sliding surface 58 in the cutting link. From the other side of plane M, each head has a cylindrical stem portion 60 the length b of which is equal to or somewhat larger than one half of the thickness of the chain. The coupling link and cutting link are put together, as illustrated in FIG. 8, and are positioned in a forging tool comprising a platen 62 and a rotatable forging mandrel 64 having a conical head 66 with a cone angle sufficient to forge stem portion 60 to the angle of the bearing or sliding surface, i.e. an angle of 45° in the illustrated embodiment. By means of this tool the stem portion 60 is by deformation forced outwardly with the consequence that the metal stem portion 60 flows to the position indicated in FIG. 9a. That is, the stem assumes the same conical shape as the head section 56, whereby the interlinking of the elements is completed in a desirable manner by the formation of conical or wedge-shaped interlocking sliding surfaces 57 and 58. It should be observed that the particular shape and cone angle of the mandrel is not very critical.

When making somewhat large chains it is preferred to use a mandrel provided with an annularly shaped conical head as shown in FIG. 9b. By using such a rotatable mandrel the central portion of the metal of the stem will not be deformed in an outwardly direction, but will instead remain in place at a center knob 59. After all the links in the chain have been interconnected in this manner, the completed saw chain is preferably given a finishing grinding operation along both side faces in order to make same even and smooth.

Figure 10:
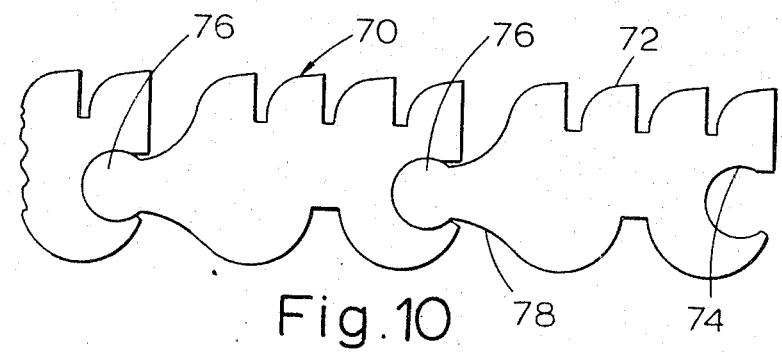
FIG. 10 illustrates a modified embodiment of a saw chain in accordance with the present invention.

FIG. 10 illustrates a modified embodiment of a chain in accordance with the invention. Instead of using separate coupling links such as 8 and 10 shown in FIG. 1, the cutting links 70, 72 etc. are each formed with a circularly shaped opening 74 in one end thereof and a circularly shaped head 76 in the other end thereof. Otherwise the chain of FIG. 10 is shaped exactly as described above and it is assembled in a similar manner. As to operation and use the difference exists that the chain of FIG. 10 will be somewhat stiffer in a direction transverse of the cutting plane, since the links necessarily will be somewhat longer from end to end and because the bearing heads with regard to strength must be made somewhat wider in the neck zone 78, whereby the separate links attain a somewhat smaller pivoting angle, than in the embodiment of FIG. 1. A chain of this type will primarily be suitable for larger saw chains, for example for stationary saw tools or machines wherein the running and driving wheels of the chains may be given a larger diameter than is the case in connection with the running wheels on the saw sword on a portable manual chain saw.

As previously mentioned, a saw chain in accordance with the present invention may, compared with conventional saw chains, be given an effective width and thereby a cutting width which is about 50% of the width typical of a conventional saw chain. A saw in accordance with the invention will further be much lighter and more economical to produce. This will further influence the total weight of the sawing tool provided with a saw chain in accordance with the invention. Since the sawing cut will be narrower than usual, less power is required to perform the sawing operation in question. Extensive trials with saw chains in accordance with the present invention have shown that wear and tear on the chain, and particularly on the sliding link faces, is very slight, and indicate that saw chains in accordance with the invention at least have the same durability as conventional saw chains having overlapping links. A special advantage of the saw chain designed in accordance with the invention rests in the fact that the stationary guiding rails or shims on each side of the chain can be extended all the way up above the pivotal connections between adjacent links and up to the teeth on the chain, whereby the guiding of the chain is improved. As a specific example of a portable motor chain saw the guiding rails or shims may be given a thickness of about 0.5 mm, while the chain itself can be given a thickness or width of about 3 mm, such that the total width and cutting width of the saw sword will attain about 3.2 mm. A conventional saw chain having the same sawing capacity will normally have a cutting width of about 9 mm.

Although specific embodiments of the invention have been described in detail, such description is intended to be illustrative only, since details of the performance and construction of the invention may be altered or modified without departing from the spirit or scope thereof.

I claim:

1. A saw chain for use in a chain saw, said saw chain comprising:

an assembly of links, said links having at the longitudinal ends thereof circular-shaped openings and complementary circular-shaped heads;

the heads of said links being pivotally and nonremovably received in the openings of adjacent of said links; the entire peripheries of said openings and heads having, as viewed in a radial cross-section, complementary V-shaped configurations with flat opposed sliding surfaces in contact; and said links having opposite flat lateral surfaces, the lateral surfaces of all of said links being contiguously flush with each other.

2. A saw chain as claimed in claim 1, wherein said peripheral surface of each of said openings is formed by a V-shaped ridge, and said peripheral surface of each of said heads is formed by a V-shaped groove.

3. A saw chain as claimed in claim 2, wherein each of said links of said assembly of links comprises a cutting link with an opening at one end thereof and a head at the opposite end thereof.

4. A saw chain as claimed in claim 2, wherein said assembly of links comprises a plurality of cutting links each having openings on opposite ends thereof, and a plurality of coupling links each having heads on opposite ends thereof, said cutting links being alternatively assembled with said coupling links to form said saw chain.

* * * * *